(12) United States Patent
Yamashita et al.

(10) Patent No.: US 11,827,033 B2
(45) Date of Patent: Nov. 28, 2023

(54) INK JET RECORDING METHOD AND INK JET RECORDING APPARATUS

(71) Applicant: CANON KABUSHIKI KAISHA, Tokyo (JP)

(72) Inventors: Tomohiro Yamashita, Kanagawa (JP); Takashi Saito, Kanagawa (JP); Arihiro Saito, Saitama (JP); Maki Motomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 17/379,123

(22) Filed: Jul. 19, 2021

(65) Prior Publication Data

US 2022/0024218 A1 Jan. 27, 2022

(30) Foreign Application Priority Data

Jul. 22, 2020 (JP) .................................. 2020-125239
Jun. 22, 2021 (JP) .................................. 2021-103217

(51) Int. Cl.
*B41J 2/21* (2006.01)
*B41M 5/00* (2006.01)
(Continued)

(52) U.S. Cl.
CPC ............. *B41J 2/2107* (2013.01); *B41J 2/175* (2013.01); *B41J 2/17509* (2013.01); *B41M 5/0023* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553;
(Continued)

(56) References Cited

U.S. PATENT DOCUMENTS 6,799,841 B2 10/2004 Iri et al.
7,160,372 B2 1/2007 Yoshizawa et al.
(Continued)

*Primary Examiner* — Manish S Shah
(74) *Attorney, Agent, or Firm* — Venable LLP

(57) ABSTRACT

An ink jet recording method for recording an image uses an ink jet recording apparatus that includes an aqueous ink, a first ink storage portion that stores the aqueous ink, a second ink storage portion that stores the aqueous ink without impregnating it into an absorbent, and a recording head. The second ink storage portion and the recording head compose therein an ink flow path through which the aqueous ink is supplied, a filter that partitions an upstream side and a downstream side of the ink flow path is arranged, and a ratio (A/B) of volume A (mL) of the ink flow path to the upstream side and volume B (mL) of the ink flow path on the downstream side is 5 or more, the aqueous ink contains a coloring material, a nonionic surfactant, and a first water-soluble organic solvent having a relative dielectric constant of 30.0 or less.

20 Claims, 2 Drawing Sheets

(51) Int. Cl.
*B41J 2/175* (2006.01)
*C09D 11/38* (2014.01)

(58) Field of Classification Search
CPC ...... B41J 2/1606; B41J 2/1642; B41J 2/1609;
B41J 2/164; B41J 2/162; B41J 2/161;
B41J 2/19; B41J 15/04; C09D 11/36;
C09D 11/40; C09D 11/30; C09D 11/38;
C09D 11/32; C09D 11/322; C09D
11/324; C09D 11/328; C09D 11/101;
C09D 11/102; C09D 11/005; C09D
11/54; C09D 11/52; C09D 11/106; C09D
11/326; C09D 11/107; C09D 11/03;
C09D 11/037; C09D 11/033; B41M
5/0011; B41M 5/0017; B41M 5/0023;
B41M 5/0047; B41M 7/00; B41M
7/0072; B41M 5/52; B41M 5/5218;
B41M 5/5227
See application file for complete search history.

(56) References Cited

U.S. PATENT DOCUMENTS

| | | | |
|---|---|---|---|
| 7,226,498 B2 | 6/2007 | Yamashita et al. | |
| 7,247,194 B2 | 7/2007 | Okamura et al. | |
| 7,270,701 B2 | 9/2007 | Jinnou et al. | |
| 7,297,197 B2 | 11/2007 | Jinnou et al. | |
| 7,550,037 B2 | 6/2009 | Mafune et al. | |
| 7,611,571 B2 | 11/2009 | Yamashita et al. | |
| 7,918,928 B2 | 4/2011 | Saito et al. | |
| 8,075,126 B2 | 12/2011 | Yoshizawa et al. | |
| 8,389,600 B2 | 3/2013 | Suzuki et al. | |
| 8,469,504 B2 | 6/2013 | Saito et al. | |
| 8,616,695 B2 | 12/2013 | Mori et al. | |
| 8,857,967 B2 | 10/2014 | Saito et al. | |
| 8,871,013 B2 | 10/2014 | Sakai et al. | |
| 8,932,394 B2 | 1/2015 | Kudo et al. | |
| 8,986,435 B2 | 3/2015 | Saito et al. | |
| 8,992,674 B2 | 3/2015 | Ikegami et al. | |
| 8,998,397 B2 | 4/2015 | Mori et al. | |
| 9,371,461 B2 | 6/2016 | Saito et al. | |
| 9,453,138 B2 | 9/2016 | Shimizu et al. | |
| 9,562,165 B2 | 2/2017 | Mori et al. | |
| 9,895,901 B2 | 2/2018 | Saito et al. | |
| 9,994,012 B2 | 6/2018 | Negishi et al. | |
| 10,240,053 B2 | 3/2019 | Nushiro et al. | |
| 10,280,326 B2 | 5/2019 | Saito et al. | |
| 10,479,082 B2 | 11/2019 | Nakagawa et al. | |
| 10,562,305 B2 | 2/2020 | Saito et al. | |
| 10,563,076 B2 | 2/2020 | Saito et al. | |
| 2006/0103705 A1 | 5/2006 | Yoshizawa et al. | |
| 2006/0293410 A1* | 12/2006 | Tokita | C09D 11/54 106/31.27 |
| 2007/0035599 A1* | 2/2007 | Satoh | B41J 2/175 347/100 |
| 2010/0034972 A1 | 2/2010 | Mukae et al. | |
| 2012/0262516 A1* | 10/2012 | Yamazaki | B41J 2/17509 524/238 |
| 2014/0198151 A1* | 7/2014 | Yamamoto | C09D 11/322 106/31.77 |
| 2016/0101625 A1* | 4/2016 | Tokimatsu | B41J 2/16517 347/25 |
| 2016/0229189 A1* | 8/2016 | Karasawa | B41J 2/175 |
| 2016/0280945 A1 | 9/2016 | Mukae et al. | |
| 2016/0355019 A1* | 12/2016 | Negishi | B41J 2/195 |
| 2017/0120619 A1* | 5/2017 | Saito | B41J 2/19 |
| 2017/0246879 A1* | 8/2017 | Kudo | B41J 2/17513 |
| 2018/0333959 A1* | 11/2018 | Shinbara | B41J 2/175 |

\* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus used therefor.

Description of the Related Art

According to the ink jet recording method, images that include photographs and text can be recorded on a various recording medium. Furthermore, various types of ink adapted to purposes have been proposed, including those suitable for recording photographic quality of image on glossy paper, and those suitable for recording text or the like on plain paper.

In recent years, there has been a trend of employing the ink jet recording method for printing business document that contains text and chart on a recording medium such as plain paper, and opportunities of use for such application have been sharply increasing. In addition, the market has raised a strong need for upsizing an ink tank aiming at recording larger volume of documents. Furthermore, it has also been required that documents can be recorded more speedily than before. Under such circumstances, Japanese Patent Application Laid-Open No. 2017-001391 proposes an ink jet recording apparatus that includes a main tank capable of storing a large volume of ink, and a recording unit connected to the main tank through a tube, having a recording head and a sub tank integrated therein. Further, Japanese Patent Application Laid-Open No. 2003-080714 proposes a recording unit having a sub tank and a recording head connected therein while placing a filter in between.

SUMMARY OF THE INVENTION

The present inventors investigated into an ink jet recording method and a structure of an ink jet recording apparatus necessary for enhancing the productivity. Specifically, the inventors investigated into employment of a system in which an ink is supplied from a main tank to a recording unit having a sub tank and a recording head connected to each other while placing a filter in between, as described in Japanese Patent Application Laid-Open No. 2003-080714. The investigation revealed that employment of such system can shorten the time necessary for filling the ink, and for suction of the ink to recover the ejection mode, and can thereby improve the productivity. However depending on structures of the sub tank and the recording head, the ink was found to be ejected less smoothly, when an image is recorded by a reciprocatingly scanning operation of the recording head that takes place continuously in the main scanning direction, making the obtainable image more likely to blur.

It is, therefore, an object of the present invention to provide an ink jet recording method that excels in ink ejection stability and can record a high-quality image with high productivity, even with use of an ink jet recording apparatus equipped with a sub tank. It is another object of the present invention to provide an ink jet recording apparatus applicable to the ink jet recording method.

The above object is achieved by the following invention. That is, according to the present invention, there is provided an ink jet recording method with use of an ink jet recording apparatus that includes an aqueous ink; a first ink storage portion that stores the aqueous ink; a second ink storage portion that is connected to the first ink storage portion through a tube, and stores the aqueous ink without impregnating it into an absorbent; and a recording head that is connected to the second ink storage portion, and has formed therein an ejection orifice through which the aqueous ink supplied from the second ink storage portion is ejected, and the method including applying the aqueous ink ejected through the ejection orifice onto a recording medium to record an image, the second ink storage portion and the recording head composing therein an ink flow path through which the aqueous ink is supplied, a filter that partitions an upstream side and a downstream side of the ink flow path being arranged in the ink flow path, and a ratio (A/B) of volume A (mL) of the ink flow path on the upstream side and volume B (mL) of the ink flow path to the downstream side being 5 or more, the aqueous ink comprising a coloring material, a nonionic surfactant, and a first water-soluble organic solvent having a relative dielectric constant of 30.0 or less, and the ink jet recording apparatus being an apparatus that records an image on the basis of reciprocatingly scanning motion of the recording head.

According to the present invention, it now becomes possible to provide an ink jet recording method that excels in ink ejection stability and can record a high-quality image with high productivity, even with use of an ink jet recording apparatus equipped with a sub tank. Furthermore, according to the present invention, there is provided an ink jet recording apparatus used for such ink jet recording method.

Further features of the present invention will become apparent from the following description of exemplary embodiments with reference to the attached drawings.

DESCRIPTION OF THE EMBODIMENTS

Figure 1:
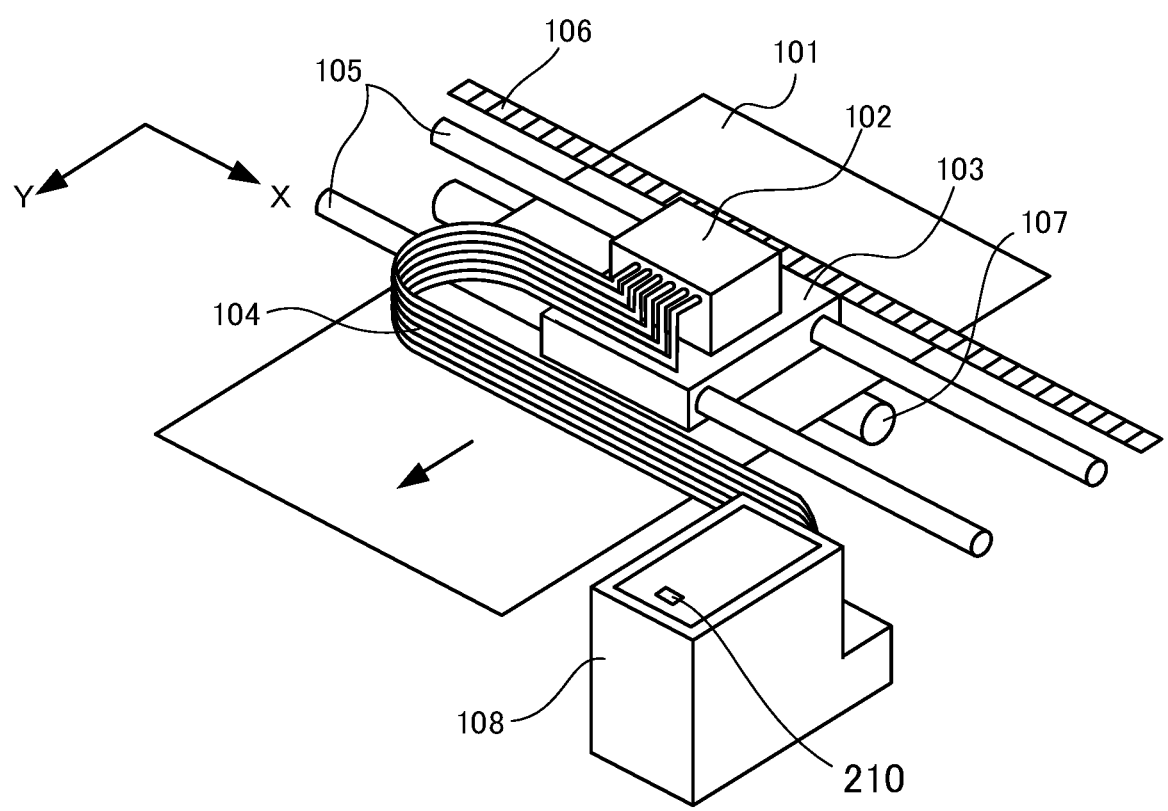
FIG. 1 is a perspective view schematically illustrating one embodiment of an ink jet recording apparatus of the present invention.

The present invention will further be detailed, referring to preferred embodiments. In the present invention, in a case where some compound is a salt, the ink will be denoted to "contain a salt" for convenience, even if the compound is ionized in the ink. The aqueous ink for ink jet use may be occasionally and simply referred to as "ink". Physical values are those observed at normal temperature (25° C.) unless otherwise specifically noted.

The present inventors first investigated into a structure necessary for recording an image at high speed over a long period of time. Use of a recording apparatus, having a first ink storage portion (main tank) and a second ink storage portion (sub tank) connected to each other through a tube, is effective for recording an image over a long period of time. Employment of such recording apparatus can shorten the time necessary for filling the ink, and for suction of the ink to recover the ejection mode, and can thereby improve the productivity. For further speed-up of image recording, an important issue is to reduce flow resistance of the ink in the sub tank, to thereby improve flow rate of the ink. That is, it is important to use a sub tank having contained therein no negative pressure generation mechanism such as an absorbent that obstructs the ink flow. This sort of sub tank is exemplified by a container with a hollow inner space (ink storage portion).

The recording apparatus, if downsized, can reduce restriction on a location, and can provide the user with a method of use well adapted to various environments and situations. The present inventors then investigated into downsizing of the recording apparatus. The present inventors consequently found that the recording head can be downsized, by reducing the volume of the ink flow path on the downstream side (recording head side) of the filter disposed between the sub tank and the recording head, whereby the recording apparatus can be downsized. A new issue, however, emerged when an image was recorded by using the thus-structured recording apparatus on the basis of a reciprocatingly scanning operation of the recording head that takes place continuously in the main scanning direction, demonstrating that the ink was found to be ejected less smoothly, and that the obtainable image was found to blur.

Such issue presumably occurs according to the mechanism below. The ink filled in the ink flow path of the recording head or the like usually contain bubbles or dissolved gas that can produce bubbles. They can be produced or entrained in the ink typically due to various recovery operations, flow of the ink, outgas from the members and the like, and repeatedly appear and dissipate in the ink supplied through the ink flow path. Bubbles that reside in the ink within the ink flow path can migrate in the ink flow path, as the ink is shaken by serial driving of the recording head, and can adhere to the filter arranged between the sub tank and the recording head. Since the bubbles adhered to the filter can give influences such as reducing flow rate of the ink, so that flow rate of the ink is not properly adjustable, possibly blurring the image. The issue of degraded ejection stability of the ink has not been recognized in the case described in Japanese Patent Application Laid-Open No. 2003-080714, with use of a recording unit in which the volume of the ink flow path on the downstream side of the filter is large to a certain extent. Also note that this case upsizes the recording unit, making it difficult to downsize the recording apparatus.

The present inventors then investigated how to solve the aforementioned issue caused by migration of the bubbles in the ink under shaking. The present inventors consequently found that the issue may be solved by using an ink that contains a nonionic surfactant and a water-soluble organic solvent having a relative dielectric constant of 30.0 or less, and arrived at the present invention. The present inventors now presume a mechanism attainable by using the ink that contains a nonionic surfactant and a water-soluble organic solvent having a relative dielectric constant of 30.0 or less, as follows.

The water-soluble organic solvent having a relative dielectric constant of 30.0 or less has a hydrophobic property. In the ink, the surfactant is oriented around the hydrophobic gas to maintain the shape of bubbles. In a case where the ink that resides around the bubbles is hydrophobic, a hydrophobic section of the surfactant that resides at the interface of the bubbles tends to be oriented not only towards the gas but also towards the ink with hydrophobicity. This presumably allows the surfactant to detach from the bubbles. That is, with the nonionic surfactant and the water-soluble organic solvent having a relative dielectric constant of 30.0 or less contained in the ink, the surfactant that resides at the interface of the bubbles detaches from the bubbles, making it unable to maintain the shape of bubbles, and instead making the bubbles more likely to burst and dissipate. Hence, with the nonionic surfactant and the water-soluble organic solvent having a relative dielectric constant of 30.0 or less contained in the ink, the bubbles become likely to burst and dissipate, even if the bubbles would migrate in the ink flow path under shaking of the ink, and would adhere to the filter. As a consequence, the bubbles that can affect the flow rate of the ink would decrease, so that the ink would be smoothly ejected, making the recorded image less likely to blur.

<Ink Jet Recording Method and Ink Jet Recording Apparatus>

The ink jet recording method of the present invention uses the ink jet recording apparatus that includes the aqueous ink, the first ink storage portion that stores the aqueous ink, the second ink storage portion that stores the aqueous ink, and the recording head having formed therein the ejection orifice through which the aqueous ink is ejected. The second ink storage portion is a member that is connected to the first ink storage portion through the tube, and stores the aqueous ink without impregnating it into the absorbent. The recording head is connected to the second ink storage portion. The ink jet recording method of the present invention includes applying the aqueous ink ejected through the ejection orifice of the recording head onto a recording medium to record an image. Furthermore, the ink jet recording apparatus of the present invention includes the aqueous ink, the first ink storage portion that stores the aqueous ink, the second ink storage portion that stores the aqueous ink, and the recording head having formed therein the ejection orifice through which the aqueous ink is ejected. The ink jet recording apparatus of the present invention is therefore an apparatus that records an image on the basis of reciprocatingly scanning motion of the recording head.

<Ink Jet Recording Apparatus>

FIG. 1 is a perspective view schematically illustrating one embodiment of the ink jet recording apparatus of the present invention. The ink jet recording apparatus of this embodiment is a so-called serial type ink jet recording apparatus that performs recording operation on the basis of reciprocatingly scanning motion of the recording head in the X-direction (main scanning direction). A recording medium 101 is intermittently conveyed in the Y-direction (sub-scanning direction) by a conveying roller 107. The recording unit 102 mounted on a carriage 103 is reciprocated for scanning in the X-direction (main scanning direction) which is orthogonal to the Y-direction in which the recording medium 101 is conveyed. The recording operation is enabled by conveyance of the recording medium 101 in the Y-direction, and by reciprocatingly scanning motion of the recording unit 102 in the X-direction. The recording unit 102 includes an ink jet type recording head 203 (FIG. 2) that ejects the supplied ink through a plurality of ejection orifices and a sub tank 202 (FIG. 2) as a second ink storage portion, and is mounted on the carriage 103. The carriage 103 is movably supported by a guide rail 105 arranged in the X-direction, and is fixed to an endless belt 106 that moves in parallel with the guide rail 105. The endless belt 106 reciprocates making use of driving force of a motor, whereby the carriage 103 is reciprocated for scanning in the X-direction.

Inside a main tank housing 108, there is housed a main tank 201 (FIG. 2) as the first ink storage portion. The main tank 201 housed in the main tank housing 108 and the sub tank 202 of the recording unit 102 are connected through an ink supply tube 104. The ink is supplied from the main tank 201 through the ink supply tube 104 to the sub tank 202 (FIG. 2), and is then ejected through the ejection orifice of the recording head 203. All of the main tank 201, the ink supply tube 104 and the sub tank 202 may be multiplied by the number of kinds of ink. The main tank 201 and the sub tank 202 are preferably connected by the ink supply tube 104 without interposing any other ink storage portion in between.

The main tank housing 108 has formed therein an ink inlet port 210 through which the ink is filled from outside of the ink jet recording apparatus into the main tank 201. The ink is filled from an ink bottle into the main tank arranged inside the ink jet recording apparatus, typically when the ink jet recording apparatus is used for the first time, and when remaining amount of ink decreased. The user can open the ink inlet port 210, and can fill the ink into the ink tank 201. That is, the main tank is installed inside the ink jet recording apparatus, and is not replaced per se.

Figure 2:
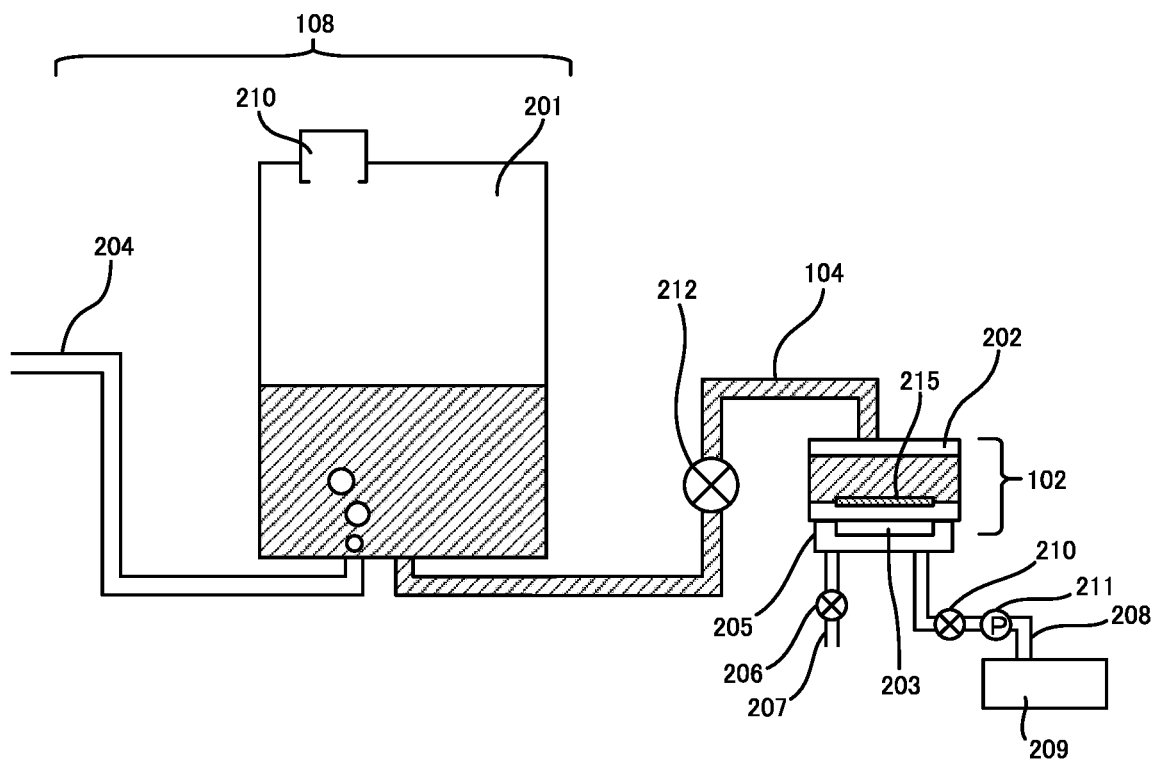
FIG. 2 is a schematic drawing schematically illustrating an example of an ink supplying system.

FIG. 2 is a schematic drawing schematically illustrating an example of an ink supplying system. The ink (indicated by hatching) stored in the main tank 201 is supplied through the ink supply tube 104 to the sub tank 202, and then supplied through a filter 215 to the recording head 203. The main tank 201 has connected thereto a gas introduction tube 204 as an air vent part. Upon completion of recording and consumption of the ink, the ink is supplied from the main tank 201 to the sub tank 202, and the ink in the main tank 201 decreases. Then, the air is introduced through the gas introduction tube 204, having one end opened to the atmosphere, into the main tank 201, whereby the internal negative pressure for retaining the ink is kept nearly constant in the ink supplying system.

The main tank 201 preferably has a large maximum volume of ink storage $V_1$ (mL), aiming at enhancing productivity by increasing the number of recordable sheets. Specifically, the maximum volume of ink storage $V_1$ (mL) of the main tank 201 is preferably 60 mL or more to 300 mL or less, and more preferably 100 mL or more to 250 mL or less. The initial volume of the ink filled in the main tank 201 is preferably up to about 95%, relative to the maximum volume of ink storage.

Also the sub tank 202 preferably has a large maximum volume of ink storage $V_2$ (mL), aiming at reducing the frequency of ink supply from the main tank 201, and at stabilizing the ink supply to the recording head 203. The maximum volume of ink storage $V_2$ (mL) of the sub tank 202 is, however, preferably not excessively large, presupposing that the sub tank 202 is mounted on the carriage 103 as illustrated in FIG. 1 to constitute the serial system. That is, the sub tank 202 designed to store too much ink will upsize the recording unit 102, possibly slowing down the moving rate of the carriage 103, and raising the need for strengthening the endless belt 106 or a motor that moves the carriage 103. The maximum volume of ink storage volume $V_2$ (mL) of the sub tank 202 is, therefore, preferably 1 mL or more to 20 mL or less, and more preferably 2 mL or more to 10 mL or less. Note that the maximum volume of ink storage $V_2$ of the sub tank is given by the total of the volume A of the upstream side of the ink flow path (volume of the upstream side of the filter in the ink flow path) and the volume B of the downstream side of the ink flow path (volume of the downstream side of the filter in the ink flow path).

Enclosures of the main tank 201 and the sub tank 202 are formed of a thermoplastic resin such as polyester, polycarbonate, polyethylene, polypropylene, polystyrene, polyphenylene ether, and mixtures or modified products thereof. From the viewpoint of enabling high-speed recording, the sub tank 202 has arranged therein no absorbent that retains the ink in an impregnated manner, instead an enclosure composing the sub tank 202 directly reserves the ink.

The recording unit 102 includes the recording head 203 and the sub tank 202. Another possible mode may be such that the sub tank 202 is attached to the recording unit 102 which is a head cartridge with a built-in recording head 203, and the recording unit 102 thus having the sub tank 202 attached thereto may be mounted on the carriage 103. Alternatively again, the recording unit 102 integrally composed of the sub tank 202 and the recording head 203 may be mounted on the carriage 103. Above all, preferred is a mode in which, as illustrated in FIGS. 1 and 2, the recording unit 102 having the sub tank 202 attached thereto is set on the carriage 103.

Ink ejection system of the recording head 203 is exemplified by a system of applying mechanical energy to the ink, and a system of applying heat energy to the ink. Among them, the system of applying heat energy to the ink before ejection is preferred.

The ink jet recording apparatus of this embodiment has, as illustrated in FIG. 2, the recording unit 102 that is composed of the sub tank 202, which is a second ink storage portion, and the recording head 203. Inside the sub tank 202 and the recording head 203 that compose the recording unit 102, the ink flow path through which the ink is supplied is formed so as to communicate the upstream end of the sub tank 202 and the downstream end where an ink ejection orifice of the recording head 203 resides. In the middle of the ink flow path, there is arranged a filter 215 that partitions the upstream side and the downstream side of the ink flow path. In the ink jet recording apparatus of this embodiment, ratio (A/B) of volume A (mL) of the ink flow path on the upstream side and volume B (mL) of the ink flow path to the downstream side is 5 or more. With the value of A/B adjusted to 5 or more by designing the volume of the ink flow path inside the sub tank (second ink storage portion) 202 and the recording head 203, or by adjusting the arrangement site of the filter 215, the height of the recording head 203 may be lowered. This enables further downsizing of the ink jet recording apparatus. The ratio (A/B) of volume A (mL) to volume B (mL) is preferably 5 or more to 50 or less, and more preferably 5 or more to 40 or less.

An ink jet recording method of the present invention includes applying the ink ejected through the ejection orifice of the recording head onto a recording medium to record an image. Since, as described above, the ink jet recording method of the present invention employs the ink jet recording apparatus that excels in ejection stability of the ink despite of its smallness, so that the image may be recorded with high productivity. Specifically, the moving rate of the recording head when recording an image may be preferably set to 30 inches/second or more, and more preferably 35 inches/second or more. The moving rate is preferably 70 inches/second or less. Furthermore, the image is preferably recorded by applying the ink to a unit region of the recording medium, per single-scanning motion of the recording head relative to the recording medium. The unit region may be a freely selectable area such as a single pixel or a single band.

The recording medium on which images are recorded may be any of known ones. Among them, preferably used are permeable paper such as recording medium including plain paper and non-coated paper, and recording medium having a coating layer such as glossy paper and art paper.

<Aqueous Ink>

The ink jet recording method of the present invention includes applying the aqueous ink ejected through the ejection orifice of the recording head onto the recording medium to record an image. The aqueous ink contains the coloring material, the nonionic surfactant, and the first water-soluble organic solvent having a relative dielectric constant of 30.0 or less. Hereinafter, components of the ink and other aspects will be described.

[Coloring Material]

As the coloring material, pigment or dye may be used. Content (% by mass) of the coloring material in the ink is preferably 0.1% by mass or more to 15.0% by mass or less relative to the total mass of the ink, and is more preferably 1.0% by mass or more to 10.0% by mass or less.

When pigment is employed as the coloring material, mode of dispersion of the pigment is not specifically limited. For example, employable are resin-dispersed pigment dispersed with a resin dispersant, surfactant-dispersed pigment, and a microcapsule pigment whose particle surface is at least partially covered with a resin or the like. In addition, also employable are self-dispersible pigment having a functional group that contains a hydrophilic group such as an anionic group bound on the particle surface of the pigment; and pigment having organic group that contains a polymer chemically bound to the particle surface of the pigment (resin-bound, self-dispersible pigment). Pigments based on different modes of dispersion may alternatively be used in a combined manner. Among them, self-dispersible pigment having a functional group that contains a hydrophilic group such as an anionic group bound on the particle surface of the pigment, and the resin-dispersed pigment dispersed with a resin dispersant are preferred. The resin dispersant preferably employs a water-soluble resin. In particular, the coloring material of black ink is preferably a self-dispersible pigment in which a functional group that contains an anionic group is bound to the particle surface of carbon black, meanwhile the coloring material of color ink is preferably a resin-dispersible pigment in which organic pigment is dispersed with the aid of water-soluble resin as the resin dispersant.

The pigment is exemplified by inorganic pigments such as carbon black; and organic pigments such as azo pigment, phthalocyanine, quinacridone, isoindolinone, imidazolone, diketopyrrolopyrrole and dioxazine. These pigments can be used singly or in combination of two or more kinds thereof.

The dye is exemplified by direct dye, acidic dye, basic dye, disperse dye and edible dye. Among them, dye having an anionic group is preferably used. The dye is specifically exemplified by those having skeleton of azo pigment, triphenylmethane, phthalocyanine, azaphthalocyanine, xanthene and anthrapyridone.

[Surfactant]

The ink contains a surfactant including a nonionic surfactant. Examples of the nonionic surfactant include various surfactants such as hydrocarbonaceous surfactant, fluorochemical surfactant and silicone-based surfactant. The nonionic surfactant is preferably at least one of hydrocarbonaceous surfactant and a fluorochemical surfactant. By using an ink containing at least one of hydrocarbonaceous surfactant and fluorochemical surfactant, bubbles in the ink can more easily dissipate, and ejection stability of the ink can be further improved.

The hydrocarbonaceous nonionic surfactant is exemplified by polyoxyethylene alkyl ethers, ethylene oxide adducts of acetylene glycol, polyethylene glycol polypropylene glycol block copolymers and ethylene oxide adducts of polyhydric alcohols. The fluorochemical nonionic surfactant is exemplified by perfluoroalkyl ethylene oxide adducts. The silicone-based nonionic surfactant is exemplified by polyether-modified siloxane compound. In particular, it is preferable to use both a hydrocarbonaceous nonionic surfactant and a fluorochemical nonionic surfactant. When these surfactants are used in combination, the content of the hydrocarbonaceous nonionic surfactant is preferably more than the content of the fluorochemical nonionic surfactant.

The nonionic surfactant preferably has an HLB value of 8.0 or more, which is more preferably 10.0 or more to 18.5 or less. With the HLB set less than 8.0, the nonionic surfactant will be less effective to dissipate bubbles in the ink, and would degrade its effect of improving the ejection stability of the ink. The "HLB value" of the nonionic surfactant in the context of this patent specification is a value determined by the Griffin's method.

The ink may further contain various surfactants (other surfactants) other than the nonionic surfactant. Other surfactants are exemplified by anionic surfactant, cationic surfactants and amphoteric surfactant. Such other surfactants may also be hydrocarbonaceous surfactant, fluorochemical surfactant, silicone-based surfactant or the like.

Content (% by mass) of the surfactant (total of the nonionic surfactant and the other surfactants) in the ink is preferably 0.1% by mass or more to 5.0% by mass or less relative to the total mass of the ink, and more preferably 0.2% by mass or more to 1.5% by mass or less.

[Resin]

The ink may contain a resin. The resin can be added to the ink, in order (i) to stabilize the state of dispersion of the pigment, that is, can be added as a resin dispersant or an auxiliary thereof. Furthermore, the resin can be added to the ink, in order (ii) to improve various characteristics of the image to be recorded. The resin may reside in the ink as dissolved in an aqueous medium, or in the form of particle dispersed in the aqueous medium. The phrase "the resin is water-soluble" in this patent specification means that the resin does not form a particle whose size is measurable by a method such as dynamic light scattering method, after being neutralized with an alkali equivalent to the acid value. Content (% by mass) of the resin in the ink is preferably 0.1% by mass or more to 5.0% by mass or less relative to the total mass of the ink, and is more preferably 0.1% by mass or more to 3.0% by mass or less.

The resin is exemplified by acrylic resin, polyester resin, urethane resin, urea resin, polysaccharide and polypeptide. Among them, acrylic resin and urethane resin are preferred from the viewpoint of ejection property through the ejection orifice of the recording head. The resin component such as resin particle, however, tends to retain bubbles, and is preferably not contained too much.

The anionic group of the water-soluble resin may form a salt. Cation that can form the salt is exemplified by cations of alkali metals such as lithium, sodium and potassium; ammonium ion ($NH_4^+$); and cations of organoammonium such as dimethylamine and triethanolamine. The resin preferably has an acid value of 40 mgKOH/g or more to 300 mgKOH/g or less.

(Aqueous Medium)

The ink is an aqueous ink that contains at least water as the aqueous medium. The ink also contains the first water-soluble organic solvent having a relative dielectric constant of 30.0 or less. That is, the ink can contain an aqueous medium that is a mixed solvent of water and the first water-soluble organic solvent. With use of the ink that contains both of the first water-soluble organic solvent and the nonionic surfactant, bubbles generated in the ink can effectively dissipate as described above, and ejection stability of the ink may be improved.

The first water-soluble organic solvent may only be a water-soluble organic solvent having a relative dielectric constant of 30.0 or less. Specifically, any ink applicable to ink jet use, such as alcohols, (poly) alkylene glycols, glycol ethers, nitrogen-containing compounds and sulfur-containing compounds may be used. The first water-soluble organic solvent is exemplified by 1,3-butanediol (30.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,3-butanediol (24.0), 3-methyl-1,5-pentanediol (23.9), 1-(hydroxymethyl)-5,5-dimethylhydantoin (23.7), triethylene glycol (22.7), 1,2-butanediol (22.2), tetraethylene glycol (20.8), dipropylene glycol (19.7), polyethylene glycol (18.9) having a number average molecular weight of 200, 2-ethyl-1,3-hexanediol (18.5), 1,2-hexanediol (14.8), propylene glycol monomethyl ether (12.4), polyethylene glycol (11.4) having a number average molecular weight of 600, diethylene glycol monobutyl ether (11.0), triethylene glycol monobutyl ether (9.8), ethylene glycol monobutyl ether (9.4), tetraethylene glycol monobutyl ether (9.4), tripropylene glycol monomethyl ether (8.5), 1,6-hexanediol (7.1) and polyethylene glycol (4.6) having a number average molecular weight of 1,000. The numerical value in the parentheses following each water-soluble organic solvent represents relative dielectric constant of each water-soluble organic solvent at 25° C. The first water-soluble organic solvent preferably has a relative dielectric constant of 3.0 or more. The first water-soluble organic solvent is preferably any of those having the vapor pressure lower than that of water. Among them, 1,3-butanediol, 2-pyrrolidone, 3-methyl-1,5-pentanediol, triethylene glycol, 1,2-hexanediol and triethylene glycol monobutyl ether are preferred as the first water-soluble organic solvent, wherein triethylene glycol is further preferred. Content (% by mass) of the first water-soluble organic solvent in the ink is preferably 3.0% by mass or more to 50.0% by mass or less, relative to the total mass of the ink.

The relative dielectric constant of the water-soluble organic solvent may be measured by using a dielectric constant meter (such as "BI-870" (trade name) from Brookhaven Instruments Corporation, for example) at a frequency of 10 kHz. For the water-soluble organic solvent that exists as a solid at 25° C., the relative dielectric constant is measured in a 50% by mass aqueous solution thereof, and is calculated from the equation (1) below. While a term "water-soluble organic solvent" usually represents liquid, the present invention will be understood to include those that exist as solid at 25° C. (normal temperature).

$$\varepsilon_{sol} = 2\varepsilon_{50\%} - \varepsilon_{water} \qquad (1)$$

$\varepsilon_{sol}$: relative dielectric constant of water-soluble organic solvent existing as solid at 25° C.

$\varepsilon_{50\%}$: relative dielectric constant of 50% by mass aqueous solution of water-soluble organic solvent existing as solid at 25° C.

$\varepsilon_{water}$: relative dielectric constant of water

The water-soluble organic solvent that is widely used for aqueous inks and exists as a solid at 25° C. is exemplified by 1,6-hexanediol, trimethylolpropane, ethylene urea, urea, and polyethylene glycol having a number average molecular weight of 1,000. The reason why the relative dielectric constant of the water-soluble organic solvent that exists as a solid at 25° C. is determined on the basis of the relative dielectric constant of 50% by mass aqueous solution, is as follows. Among water-soluble organic solvents that exist as solid at 25° C. and applicable to a component of the aqueous ink, some of them can hardly yield a concentrated solution whose concentration exceeds 50% by mass. On the other hand, an aqueous solution whose concentration is only as low as 10% by mass or below will have the relative dielectric constant governed by water, making it unable to determine a probable (effective) value of relative dielectric constant of the water-soluble organic solvent. The present inventors then found from our investigations that the most of the water-soluble organic solvents that exist as solid at 25° C. and applicable to the ink may yield aqueous solution to be measured, and also found that the relative dielectric constant thus determined reasonably matches with the effect of the present invention. For this reason, the present inventor decided to employ the 50% by mass aqueous solution. For any water-soluble organic solvent that exists as solid at 25° C. but cannot yield the 50% by mass aqueous solution due to its poor solubility in water, a saturated aqueous solution will be prepared, and the relative dielectric constant determined similarly to the case where $\varepsilon_{sol}$ was calculated as described above will be used for convenience.

The ink may further contain a water-soluble organic solvent other than the first water-soluble organic solvent (other water-soluble organic solvents). Such other water-soluble organic solvent employable here may be any of those applicable to the ink for ink jet use, such as alcohols, (poly)alkylene glycols, glycol ethers, nitrogen-containing compounds and sulfur-containing compounds. Such other water-soluble organic solvent is exemplified by urea (110.3), ethylene urea (49.7), dimethyl sulfoxide (48.9), glycerin (42.3), γ-butyrolactone (41.9), ethylene glycol (40.4), 1-(2-hydroxyethyl)-2-pyrrolidone (37.6), trimethylolpropane (33.7), N-methyl-2-pyrrolidone (32.0), triethanolamine (31.9), diethylene glycol (31.7) and 1,4-butanediol (31.1). Each of such other water-soluble organic solvents preferably has a relative dielectric constant of 150.0 or less. Such other water-soluble organic solvents are preferably those having the vapor pressure lower than that of water. The numerical value in the parentheses following each water-soluble organic solvent represents relative dielectric constant of each water-soluble organic solvent at 25° C.

Content (% by mass) of the water-soluble organic solvent (total of the first water-soluble organic solvent and the other water-soluble organic solvent) in the ink is preferably 3.0% by mass or more to 50.0% by mass or less, relative to the total mass of the ink. Content (% by mass) of the first water-soluble organic solvent in the ink is preferably 1.0% by mass or more to 20.0% by mass or less relative to the total mass of the ink, and more preferably 2.5% by mass or more to 15.0% by mass or less. Furthermore, a mass ratio of a content (% by mass) of the first water-soluble organic solvent in the ink to a content (% by mass) of the nonionic surfactant is preferably 5.0 times or more as large, the mass ratio is more preferably 7.0 times or more to 50.0 times or less. With the mass ratio adjusted to 5.0 times or more, the orientation of the nonionic surfactant can be effectively disturbed, bubbles in the ink can more effectively dissipate, whereby ejection stability of the ink can be further improved.

The water is preferably deionized water or ion-exchanged water. Content (% by mass) of water in the ink is preferably 50.0% by mass or more to 95.0% by mass or less, relative to the total mass of the ink.

[Other Components]

Besides the aforementioned components, the ink may optionally contain various additives such as pH adjusting agent, viscosity modifier, rust inhibitor, antiseptic, antifungal agent, antioxidant and reduction inhibitor. Contents of these additives in the ink are considerably small in most cases, and are less directly influential on the effects utilized in the present invention. These additives are, therefore, not included in the "water-soluble organic solvent" in the present invention, and are not subject to calculation of the relative dielectric constant.

EXAMPLES

The present invention will further be detailed below, referring to Examples and Comparative Examples. The present invention is, however, by no means limited to these Examples, without departing from the spirit thereof. All descriptions regarding amount of components given in "part(s)" or "%" are on the mass basis unless otherwise specifically noted.

<Preparation of Pigment Dispersion Liquid>

(Pigment Dispersion Liquid 1)

A solution prepared by dissolving 70.6 mmol of concentrated hydrochloric acid in 5.5 g of water was cooled down to 5° C., to which 9.8 mmol of 4-aminophthalic acid was added. A container that contains this solution was placed on an ice bath, and the solution was kept stirred constantly under cooling at 10° C. or lower. To the solution, added was a solution prepared by dissolving 24.9 mmol of sodium nitrite in 9.0 g of water at 5° C. The mixture was kept stirred for additional 15 minutes, to which 6.0 g of a pigment was added under stirring. The pigment used here was carbon black (trade name: "Black Pearls 880", from Cabot Corporation). The mixture was further stirred for 15 minutes to obtain a slurry. The obtained slurry was filtered through a filter paper (trade name "Standard filter paper No. 2", from Advantec), the residue was washed thoroughly with water, and dried in an oven at 110° C. to obtain a self-dispersible pigment. Ion-exchanged water was added to the pigment while properly adjusting the content, to obtain pigment dispersion liquid 1. Pigment dispersion liquid 1 was found to contain a self-dispersible pigment having bound on the particle surface thereof phthalic acid group whose counter ion is sodium ion, and to have a pigment content of 10.0%.

(Pigment Dispersion Liquid 2)

Pigment dispersion liquid 2 was obtained in the same way as the aforementioned pigment dispersion liquid 1, except that the pigment was changed to C.I. Pigment Red 122. Pigment dispersion liquid 2 was found to contain a self-dispersible pigment having bound on the particle surface thereof phthalic acid group whose counter ion is sodium ion, and to have a pigment content of 10.0%.

(Pigment Dispersion Liquid 3)

Pigment dispersion liquid 3 was obtained in the same way as the aforementioned pigment dispersion liquid 1, except that the pigment was changed to C.I. Pigment Blue 15:3. Pigment dispersion liquid 3 was found to contain a self-dispersible pigment having bound on the particle surface thereof phthalic acid group whose counter ion is sodium ion, and to have a pigment content of 10.0%.

(Pigment Dispersion Liquid 4)

Mixed were 10.0 parts of a pigment, 20.0 parts of an aqueous solution of a resin dispersant (resin content (solid content): 20.0%), and 70.0 parts of ion-exchanged water, to obtain a mixture. The pigment used here was carbon black (trade name: "Black Pearls 880", from Cabot Corporation). The aqueous solution of the resin dispersant used here was an aqueous solution prepared by dissolving a styrene-acrylic acid copolymer (weight average molecular weight: 10,000, acid value: 200 mgKOH/g), which is a water-soluble resin, into ion-exchanged water, while neutralizing it by using sodium hydroxide that amounts equivalent to the acid value. The obtained mixture was allowed to disperse in a batch-type vertical sand mill for three hours, and then filtered under pressure through a microfilter (from FUJIFILM Corporation) with a pore size of 1.2 µm. Next, ion-exchanged water was added to adjust the content of the pigment, thereby obtaining pigment dispersion liquid 4. Pigment dispersion liquid 4 was found to contain a pigment dispersed with a water-soluble resin (resin dispersant), and to have a pigment content of 10.0%, and a water-soluble resin content of 4.0%.

(Pigment Dispersion Liquid 5)

Pigment dispersion liquid 5 was obtained in the same way as the aforementioned pigment dispersion liquid 4, except that the pigment was changed to C.I. Pigment Red 122. Pigment dispersion liquid 5 was found to contain a pigment dispersed with a water-soluble resin (resin dispersant), and to have a pigment content of 10.0%, and a water-soluble resin content of 4.0%.

(Pigment Dispersion Liquid 6)

A pigment dispersion liquid 6 was obtained in the same way as the aforementioned pigment dispersion liquid 4, except that the pigment was changed to C.I. Pigment Yellow 74. The pigment dispersion liquid 6 was found to contain a pigment dispersed with a water-soluble resin (resin dispersant), and to have a pigment content of 10.0%, and a water-soluble resin content of 4.0%.

(Pigment Dispersion Liquid 7)

Pigment dispersion liquid 7 was obtained in the same way as the aforementioned pigment dispersion liquid 4, except that the pigment was changed to C.I. pigment blue 15:3. Pigment dispersion liquid 7 was found to contain a pigment dispersed with a water-soluble resin (resin dispersant), and to have a pigment content of 10.0%, and a water-soluble resin content of 4.0%.

<Preparation of Aqueous Dye Solution>

A commercially available aqueous dye solution that contains a dye (trade name: Pro-Jet Fast Black 2, from FUJIFILM Corporation) was prepared. Content of the dye in the thus prepared aqueous dye solution was adjusted to obtain an aqueous dye solution. The aqueous dye solution was found to have a dye content of 10.0%.

<Preparation of Surfactant>

Surfactants listed in Table 1 were prepared.

TABLE 1

| | Properties of Surfactants | | | | |
|---|---|---|---|---|---|
| Surfactant | Ionicity | Skeleton | HLB value | Structure | Trade name |
| 1 | Nonionic | Hydrocarbonaceous | 4.0 | Ethylene oxide adduct of acetylene glycol | Surfynol 420 (Nissin Chemical Co., Ltd.) |
| 2 | Nonionic | Hydrocarbonaceous | 8.8 | Ethylene oxide adduct of acetylene glycol | Acetylenol E40 (Kawaken Fine Chemicals Co., Ltd.) |

TABLE 1-continued

Properties of Surfactants

| Surfactant | Ionicity | Skeleton | HLB value | Structure | Trade name |
|---|---|---|---|---|---|
| 3 | Nonionic | Hydrocarbonaceous | 13.2 | Ethylene oxide adduct of acetylene glycol | Acetylenol E100 (Kawaken Fine Chemicals Co., Ltd.) |
| 4 | Nonionic | Hydrocarbonaceous | 15.7 | Polyoxyethylene cetyl ether | NIKKOL BC-20 (Nikko Chemicals Co., Ltd.) |
| 5 | Nonionic | Hydrocarbonaceous | 19.1 | Ethylene oxide adduct of glycerin | Uniox G-1200 (NOF Corporation) |
| 6 | Nonionic | Fluorochemical | 10.5 | Perfluoroalkyl ethylene oxide adduct | Zonyl FS-3100 (DuPont) |
| 7 | Nonionic | Silicone-based | 5.0 | Polyether-modified polysiloxane | Dowsil FZ-2130 (The Dow Chemical Company) |
| 8 | Nonionic | Silicone-based | 15.0 | Polyether-modified polysiloxane | Dowsil FZ-2162 (The Dow Chemical Company) |
| 9 | Nonionic | Silicone-based | 18.0 | Polyether-modified polysiloxane | Dowsil FZ-2161 (The Dow Chemical Company) |
| 10 | Anionic | Fluorochemical | — | Perfluoroalkylcarboxylate salt | Megaface F-410 (DIC Corporation) |

<Preparation of Ink>

Components (in %) listed in the upper lines of Table 2 were mixed, thoroughly stirred, and filtered under pressure through a microfilter (from FUJIFILM Corporation) with a pore size of 3.0 μm, to thereby prepare each ink. In Table 2, the numerical value in the parentheses following each water-soluble organic solvent represents relative dielectric constant of each water-soluble organic solvent at 25° C. Properties of the prepared inks are summarized in the lower lines of Table 2.

TABLE 2

Compositions and Properties of Ink

| | Ink | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Pigment dispersion liquid 1 | 40.0 | | | | | | | | 40.0 | 40.0 | 40.0 | 40.0 | 40.0 | 40.0 | 40.0 | 40.0 | 40.0 |
| Pigment dispersion liquid 2 | | 40.0 | | | | | | | | | | | | | | | |
| Pigment dispersion liquid 3 | | | 40.0 | | | | | | | | | | | | | | |
| Pigment dispersion liquid 4 | | | | 40.0 | | | | | | | | | | | | | |
| Pigment dispersion liquid 5 | | | | | 40.0 | | | | | | | | | | | | |
| Pigment dispersion liquid 6 | | | | | | 40.0 | | | | | | | | | | | |
| Pigment dispersion liquid 7 | | | | | | | 40.0 | | | | | | | | | | |
| Aqueous dye solution | | | | | | | | 40.0 | | | | | | | | | |
| Glycerin (42.3) | 5.0 | 5.0 | 5.0 | 5.0 | 5.0 | 5.0 | 5.0 | 5.0 | 5.0 | 5.0 | 5.0 | 5.0 | 5.0 | 5.0 | 13.0 | 12.5 | 10.0 |
| 1,4-Butanediol (31.1) | | | | | | | | | | | | | | | | | |
| 1,3-Butanediol (30.0) | | | | | | | | | | 10.0 | | | | 2.5 | | | |
| 2-Pyrrolidone (28.0) | | | | | | | | | | | 10.0 | | | | | | |
| 3-Methyl-1,5-pentanediol (23.9) | | | | | | | | | | | | 10.0 | | | | | |
| Triethylene glycol (22.7) | 10.0 | 10.0 | 10.0 | 10.0 | 10.0 | 10.0 | 10.0 | 10.0 | | | | | | 5.0 | 2.0 | 2.5 | 5.0 |
| 1,2-Hexanediol (14.8) | | | | | | | | | | | | | 10.0 | | | | |
| Triethylene glycol monobutyl ether (9.8) | | | | | | | | | | | | | | 10.0 | 2.5 | | |
| Surfactant 1 | | | | | | | | | | | | | | | | | |
| Surfactant 2 | | | | | | | | | | | | | | | | | |
| Surfactant 3 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Surfactant 4 | | | | | | | | | | | | | | | | | |
| Surfactant 5 | | | | | | | | | | | | | | | | | |
| Surfactant 6 | | | | | | | | | | | | | | | | | |
| Surfactant 7 | | | | | | | | | | | | | | | | | |
| Surfactant 8 | | | | | | | | | | | | | | | | | |
| Surfactant 9 | | | | | | | | | | | | | | | | | |
| Surfactant 10 | | | | | | | | | | | | | | | | | |
| Ion-exchanged water | 44.5 | 44.5 | 44.5 | 44.5 | 44.5 | 44.5 | 44.5 | 44.5 | 44.5 | 44.5 | 44.5 | 44.5 | 44.5 | 44.5 | 44.5 | 44.5 | 44.5 |
| Content S of first water-soluble organic solvent (%) | 10.0 | 10.0 | 10.0 | 10.0 | 10.0 | 10.0 | 10.0 | 10.0 | 10.0 | 10.0 | 10.0 | 10.0 | 10.0 | 10.0 | 2.0 | 2.5 | 5.0 |

TABLE 2-continued

| | | | | | | | | | | | | | | | | |
|---|---|---|---|---|---|---|---|---|---|---|---|---|---|---|---|---|
| Compositions and Properties of Ink | | | | | | | | | | | | | | | | |
| Content N of nonionic surfactant (%) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| S/N (times) | 20.0 | 20.0 | 20.0 | 20.0 | 20.0 | 20.0 | 20.0 | 20.0 | 20.0 | 20.0 | 20.0 | 20.0 | 20.0 | 20.0 | 4.0 | 5.0 | 10.0 |

| | Ink | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| Pigment dispersion liquid 1 | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 |
| Pigment dispersion liquid 2 | | | | | | | | | | | | | | | | |
| Pigment dispersion liquid 3 | | | | | | | | | | | | | | | | |
| Pigment dispersion liquid 4 | | | | | | | | | | | | | | | | |
| Pigment dispersion liquid 5 | | | | | | | | | | | | | | | | |
| Pigment dispersion liquid 6 | | | | | | | | | | | | | | | | |
| Pigment dispersion liquid 7 | | | | | | | | | | | | | | | | |
| Aqueous dye solution | | | | | | | | | | | | | | | | |
| Glycerin (42.3) | 1.0 | 5.0 | 5.0 | 5.0 | 5.0 | 5.0 | 5.0 | 5.0 | 5.0 | 5.0 | 13.0 | 13.0 | 15.0 | 5.0 | 5.0 | 5.0 |
| 1,4-Butanediol (31.1) | | | | | | | | | | | | | | 10.0 | | |
| 1,3-Butanediol (30.0) | | | | | | | | | | | | | | | | |
| 2-Pyrrolidone (28.0) | | | | | | | | | | | | | | | | |
| 3-Methyl-1,5-pentanediol (23.9) | | | | | | | | | | | | | | | | |
| Triethylene glycol (22.7) | 10.0 | 10.0 | 10.0 | 10.0 | 10.0 | 10.0 | 10.0 | 10.0 | 10.0 | 10.0 | 2.0 | 2.0 | | | 10.0 | 10.0 |
| 1,2-Hexanediol (14.8) | | | | | | | | | | | | | | | | |
| Triethylene glycol monobutyl ether (9.8) | | | | | | | | | | | | | | | | |
| Surfactant 1 | | 0.5 | | | | | | | | | | | | | | |
| Surfactant 2 | | | 0.5 | | | | | | | | | | | | | |
| Surfactant 3 | 0.2 | | | | | | | | 0.3 | | | 0.5 | 0.5 | | | |
| Surfactant 4 | | | | 0.5 | | | | | | | | | | | | |
| Surfactant 5 | | | | | 0.5 | | | | | | | | | | | |
| Surfactant 6 | | | | | | 0.5 | | | | 0.2 | | | | | | |
| Surfactant 7 | | | | | | | 0.5 | | | | 0.5 | | | | | |
| Surfactant 8 | | | | | | | | 0.5 | | | | | | | | |
| Surfactant 9 | | | | | | | | | 0.5 | | 0.5 | | | | | |
| Surfactant 10 | | | | | | | | | | | | | | 0.5 | | |
| Ion-exchanged water | 48.8 | 44.5 | 44.5 | 44.5 | 44.5 | 44.5 | 44.5 | 44.5 | 44.5 | 44.5 | 44.5 | 44.5 | 44.5 | 44.5 | 44.5 | 45.0 |
| Content S of first water-soluble organic solvent (%) | 10.0 | 10.0 | 10.0 | 10.0 | 10.0 | 10.0 | 10.0 | 10.0 | 10.0 | 10.0 | 2.0 | 2.0 | 0.0 | 0.0 | 10.0 | 10.0 |
| Content N of nonionic surfactant (%) | 0.2 | 0.5 | 0.5 | 0.5 | 0.5 | 0.5 | 0.5 | 0.5 | 0.5 | 0.5 | 0.5 | 0.5 | 0.5 | 0.5 | 0.0 | 0.0 |
| S/N (times) | 50.0 | 20.0 | 20.0 | 20.0 | 20.0 | 20.0 | 20.0 | 20.0 | 20.0 | 20.0 | 4.0 | 4.0 | 0.0 | 0.0 | — | — |

<Evaluation>

An ink jet recording apparatus whose main part is structured as illustrated in FIG. 1, with the ink supplying system structured as illustrated in FIG. 2 incorporated therein, was prepared. The recording apparatus is a serial type in which the recording unit 102, with the recording head 203 incorporated therein and with the sub tank 202 attached thereto, is mounted on the carriage 103. A tube (ink supply tube 104) used here, connecting the main tank 201 and the sub tank 202, was a tube formed of a styrene-based thermoplastic elastomer, having an inner diameter of 2 mm and an outer diameter of 4 mm. The maximum volume of ink storage $V_1$ of the main tank was set to 150 mL, and the maximum volume of ink storage $V_2$ of the sub tank was set to values summarized in Table 3. Reference Example 1 employed an ink jet recording apparatus that does not have the first ink storage portion (main tank), but stores the ink only in the second ink storage portion that is formed integrally with the recording head. The cases other than Reference Example 2 employed a sub tank whose enclosure is formed of a thermoplastic resin and has no absorbent arranged therein, meanwhile Reference Example 2 employed a sub tank having the absorbent arranged therein. Reference Example 3 employed a line head, in place of the recording head 203 (serial type recording head) illustrated in FIGS. 1 and 2.

(Ejection Stability of Ink)

The prepared ink was filled into the main tank of the ink jet recording apparatus, and the ink was supplied to the sub tank and the recording head. Thereafter, a solid image with a recording duty of 50% was recorded on the entire surface of A4 size PPC paper (trade name: "GF-500", from Canon Inc.). Details of the evaluation conditions are summarized in Table 3. In this embodiment, 100% recording duty is defined when a solid image is recorded under a condition that two ink droplets each weighing 5 ng are applied to a 1/600 inch×1/600 inch unit region. The recorded solid pattern was visually observed to evaluate the ejection property of the ink according to the following evaluation criteria. Among the following evaluation criteria, "AA", "A" and "B" were regarded as acceptable levels, meanwhile "C" was regarded as an unacceptable level. Results of evaluation are summarized in Table 3.

AA: No unevenness observed in solid image.
A: Unevenness observed at ends of solid image.
B: Unevenness observed in about half of solid image.
C: Unevenness observed entirely in solid image.

therein, failed in high-speed recording of images under a condition focused on the ejection stability, and resulted in degraded throughput. The ink jet recording apparatus used in Reference Example 5 was space-consuming, since a line

TABLE 3

Conditions for Evaluation and Results of Evaluation

| | | | | | Second ink storage portion | | | | Recording head | | | |
|---|---|---|---|---|---|---|---|---|---|---|---|---|
| | | Ink | First ink storage portion | Adsorbent | Filter | Volume of ink storage $V_2$ (mL) | Volume on upstream side A (mL) | Volume on downstream side B (mL) | A/B (times) | Scanning mode | Moving rate (inches/sec) | Number of recording pass | Result of evaluation Ejection stability |
| Example | 1 | 1 | Yes | No | Yes | 7.3 | 7.0 | 0.3 | 23 | Serial | 40 | 1 | AA |
| | 2 | 1 | Yes | No | Yes | 8.4 | 7.0 | 1.4 | 5 | Serial | 40 | 1 | AA |
| | 3 | 1 | Yes | No | Yes | 7.2 | 7.0 | 0.2 | 35 | Serial | 40 | 1 | AA |
| | 4 | 1 | Yes | No | Yes | 6.2 | 6.0 | 0.2 | 30 | Serial | 40 | 1 | AA |
| | 5 | 2 | Yes | No | Yes | 7.3 | 7.0 | 0.3 | 23 | Serial | 40 | 1 | AA |
| | 6 | 2 | Yes | No | Yes | 6.2 | 6.0 | 0.2 | 30 | Serial | 40 | 1 | AA |
| | 7 | 3 | Yes | No | Yes | 7.3 | 7.0 | 0.3 | 23 | Serial | 40 | 1 | AA |
| | 8 | 4 | Yes | No | Yes | 7.3 | 7.0 | 0.3 | 23 | Serial | 40 | 1 | AA |
| | 9 | 5 | Yes | No | Yes | 7.3 | 7.0 | 0.3 | 23 | Serial | 40 | 1 | AA |
| | 10 | 6 | Yes | No | Yes | 7.3 | 7.0 | 0.3 | 23 | Serial | 40 | 1 | AA |
| | 11 | 7 | Yes | No | Yes | 7.3 | 7.0 | 0.3 | 23 | Serial | 40 | 1 | AA |
| | 12 | 8 | Yes | No | Yes | 7.3 | 7.0 | 0.3 | 23 | Serial | 40 | 1 | AA |
| | 13 | 9 | Yes | No | Yes | 7.3 | 7.0 | 0.3 | 23 | Serial | 40 | 1 | AA |
| | 14 | 10 | Yes | No | Yes | 7.3 | 7.0 | 0.3 | 23 | Serial | 40 | 1 | AA |
| | 15 | 11 | Yes | No | Yes | 7.3 | 7.0 | 0.3 | 23 | Serial | 40 | 1 | AA |
| | 16 | 12 | Yes | No | Yes | 7.3 | 7.0 | 0.3 | 23 | Serial | 40 | 1 | AA |
| | 17 | 13 | Yes | No | Yes | 7.3 | 7.0 | 0.3 | 23 | Serial | 40 | 1 | AA |
| | 18 | 14 | Yes | No | Yes | 7.3 | 7.0 | 0.3 | 23 | Serial | 40 | 1 | AA |
| | 19 | 15 | Yes | No | Yes | 7.3 | 7.0 | 0.3 | 23 | Serial | 40 | 1 | A |
| | 20 | 16 | Yes | No | Yes | 7.3 | 7.0 | 0.3 | 23 | Serial | 40 | 1 | AA |
| | 21 | 17 | Yes | No | Yes | 7.3 | 7.0 | 0.3 | 23 | Serial | 40 | 1 | AA |
| | 22 | 18 | Yes | No | Yes | 7.3 | 7.0 | 0.3 | 23 | Serial | 40 | 1 | AA |
| | 23 | 19 | Yes | No | Yes | 7.3 | 7.0 | 0.3 | 23 | Serial | 40 | 1 | A |
| | 24 | 20 | Yes | No | Yes | 7.3 | 7.0 | 0.3 | 23 | Serial | 40 | 1 | AA |
| | 25 | 21 | Yes | No | Yes | 7.3 | 7.0 | 0.3 | 23 | Serial | 40 | 1 | AA |
| | 26 | 22 | Yes | No | Yes | 7.3 | 7.0 | 0.3 | 23 | Serial | 40 | 1 | AA |
| | 27 | 23 | Yes | No | Yes | 7.3 | 7.0 | 0.3 | 23 | Serial | 40 | 1 | AA |
| | 28 | 24 | Yes | No | Yes | 7.3 | 7.0 | 0.3 | 23 | Serial | 40 | 1 | B |
| | 29 | 25 | Yes | No | Yes | 7.3 | 7.0 | 0.3 | 23 | Serial | 40 | 1 | A |
| | 30 | 26 | Yes | No | Yes | 7.3 | 7.0 | 0.3 | 23 | Serial | 40 | 1 | A |
| | 31 | 27 | Yes | No | Yes | 7.3 | 7.0 | 0.3 | 23 | Serial | 40 | 1 | AA |
| | 32 | 1 | Yes | No | Yes | 7.3 | 7.0 | 0.3 | 23 | Serial | 27 | 1 | AA |
| | 33 | 1 | Yes | No | Yes | 7.3 | 7.0 | 0.3 | 23 | Serial | 30 | 1 | AA |
| | 34 | 1 | Yes | No | Yes | 7.3 | 7.0 | 0.3 | 23 | Serial | 70 | 1 | AA |
| | 35 | 1 | Yes | No | Yes | 7.3 | 7.0 | 0.3 | 23 | Serial | 40 | 2 | AA |
| | 36 | 28 | Yes | No | Yes | 7.3 | 7.0 | 0.3 | 23 | Serial | 27 | 2 | B |
| | 37 | 29 | Yes | No | Yes | 7.3 | 7.0 | 0.3 | 23 | Serial | 27 | 2 | B |
| Comparative Example | 1 | 30 | Yes | No | Yes | 7.3 | 7.0 | 0.3 | 23 | Serial | 40 | 1 | C |
| | 2 | 31 | Yes | No | Yes | 7.3 | 7.0 | 0.3 | 23 | Serial | 40 | 1 | C |
| | 3 | 32 | Yes | No | Yes | 7.3 | 7.0 | 0.3 | 23 | Serial | 40 | 1 | C |
| | 4 | 33 | Yes | No | Yes | 7.3 | 7.0 | 0.3 | 23 | Serial | 40 | 1 | C |
| Reference Example | 1 | 1 | No | No | Yes | 7.3 | 7.0 | 0.3 | 23 | Serial | 40 | 1 | AA |
| | 2 | 1 | Yes | Yes | Yes | 7.3 | 7.0 | 0.3 | 23 | Serial | 20 | 1 | AA |
| | 3 | 30 | Yes | Yes | Yes | 7.3 | 7.0 | 0.3 | 23 | Serial | 20 | 1 | AA |
| | 4 | 1 | Yes | Yes | Yes | 3.3 | 2.6 | 0.7 | 4 | Serial | 20 | 1 | AA |
| | 5 | 1 | Yes | No | Yes | — | — | — | — | Line | — | 1 | AA |
| | 6 | 1 | Yes | No | No | 7.3 | 7.3 | — | — | Serial | 40 | 1 | AA |
| | 7 | 1 | Yes | No | Yes | 8.6 | 7.0 | 1.6 | 4 | Serial | 40 | 1 | AA |
| | 8 | 1 | Yes | No | Yes | 6.2 | 3.9 | 2.3 | 2 | Serial | 40 | 1 | AA |
| | 9 | 30 | Yes | No | Yes | 6.2 | 3.9 | 2.3 | 2 | Serial | 40 | 1 | AA |
| | 10 | 1 | Yes | No | Yes | 7.6 | 4.9 | 2.7 | 2 | Serial | 40 | 1 | AA |

Example 32 and Example 35 showed throughput levels lower than those in Example 33 and Example 1, respectively. In addition, Examples 36 and 37 showed the throughput levels lower than those in all other Examples. Reference Example 1 failed in recording a large volume of images, since the ink jet recording apparatus employed did not have the first ink storage portion (main tank). Reference Examples 2 to 4, employing the ink jet recording apparatus equipped with the sub tank having the absorbent arranged head was equipped as the recording head. Reference Example 6, employing the sub tank having no filter arranged therein, was found to easily cause ejection failure due to foreign matters such as dust. The recording head used in Reference Examples 7 to 10 was large, making the recording apparatus considerably space-consuming.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125239, filed Jul. 22, 2020 and Japanese Patent Application No. 2021-103217, filed Jun. 22, 2021 which are hereby incorporated by reference herein in their entirety.

What is claimed is:

1. An ink jet recording method with use of an ink jet recording apparatus that includes an aqueous ink; a first ink storage portion that stores the aqueous ink; a second ink storage portion that is connected to the first ink storage portion through a tube, and stores the aqueous ink without impregnating the aqueous ink into an absorbent; and a recording head that is connected to the second ink storage portion and has formed therein an ejection orifice through which the aqueous ink supplied from the second ink storage portion is ejected, the method comprising:

applying the aqueous ink ejected through the ejection orifice onto a recording medium to record an image, wherein the second ink storage portion and the recording head comprise therein an ink flow path through which the aqueous ink is supplied, a filter that partitions an upstream side and a downstream side of the ink flow path is arranged in the ink flow path, and a ratio (AB) of a volume A (mL) of the ink flow path to the upstream side and a volume B (mL) of the ink flow path on the downstream side is 5 or more to 50 or less, wherein the aqueous ink comprises a coloring material, a nonionic surfactant, and a first water-soluble organic solvent having a relative dielectric constant of 30.0 or less, and wherein the ink jet recording apparatus is an apparatus that records an image on the basis of reciprocatingly scanning motion of the recording head.

2. The ink jet recording method according to claim 1, wherein a mass ratio of a content (% by mass) of the first water-soluble organic solvent to a content (% by mass) of the nonionic surfactant is 5.0 times or more.

3. The ink jet recording method according to claim 1, wherein the nonionic surfactant has an HLB value of 8.0 or more.

4. The ink jet recording method according to claim 1, wherein the nonionic surfactant is at least one of a hydrocarbonaceous surfactant and a fluorochemical surfactant.

5. The ink jet recording method according to claim 1, wherein a moving rate of the recording head in the reciprocatingly scanning motion is 30 inches/second or more.

6. The ink jet recording method according to claim 1, wherein the image is recorded by applying the aqueous ink to a unit region of the recording medium, as a result of a single-relative scanning between the recording head and the recording medium.

7. An ink jet recording apparatus comprising:
an aqueous ink;
a first ink storage portion that stores the aqueous ink;
a second ink storage portion that is connected to the first ink storage portion through a tube, and stores the aqueous ink without impregnating the aqueous ink into an absorbent; and
a recording head that is connected to the second ink storage portion and has formed therein an ejection orifice through which the aqueous ink supplied from the second ink storage portion is ejected, wherein the second ink storage portion and the recording head comprise therein an ink flow path through which the aqueous ink is supplied, a filter that partitions an upstream side and a downstream side of the ink flow path is arranged in the ink flow path, and a ratio (A/B) of a volume A (mL) of the ink flow path to the upstream side and a volume B (mL) of the ink flow path on the downstream side is 5 or more to 50 or less, wherein the aqueous ink comprises a coloring material, a nonionic surfactant, and a first water-soluble organic solvent having a relative dielectric constant of 30.0 or less, and wherein the ink jet recording apparatus is an apparatus that records an image on the basis of reciprocatingly scanning motion of the recording head.

8. The ink jet recording method according to claim 1, wherein the ratio (A/B) of the volume A (mL) of the ink flow path to the upstream side and the volume B (mL) of the ink flow path on the downstream side is 5 or more to 40 or less.

9. The ink jet recording method according to claim 1, wherein a maximum volume of an ink storage $V_1$ (mL) of the first ink storage portion is 60 mL or more to 300 mL or less.

10. The ink jet recording method according to claim 1, wherein a maximum volume of an ink storage volume $V_2$ (mL) of the second ink storage portion is 1 mL or more to 20 mL or less.

11. The ink jet recording method according to claim 1, wherein the first ink storage portion and the second ink storage portion are connected by an ink supply tube without interposing any other ink storage portion in between.

12. The ink jet recording method according to claim 1, wherein the first ink storage portion has formed therein an ink inlet port through which the aqueous ink is filled from outside of the ink jet recording apparatus into the first ink storage portion.

13. The ink jet recording method according to claim 1, wherein a moving rate of the recording head in the reciprocatingly scanning motion is 70 inches/second or less.

14. The ink jet recording method according to claim 1, wherein the first water-soluble organic solvent has a relative dielectric constant of 3.0 or more.

15. The ink jet recording method according to claim 1, wherein a mass ratio of a content (% by mass) of the first water-soluble organic solvent to a content (% by mass) of the nonionic surfactant is 7.0 times or more to 50.0 times or less.

16. The ink jet recording method according to claim 1, wherein the nonionic surfactant has an HLB value of 18.5 or less.

17. The ink jet recording method according to claim 1, wherein a content (% by mass) of the coloring material in the aqueous ink is 0.1% by mass or more to 15.0% by mass or less, relative to the total mass of the ink.

18. The ink jet recording method according to claim 1, wherein a content (% by mass) of the first water-soluble organic solvent in the aqueous ink is 3.0% by mass or more to 50.0% by mass or less, relative to the total mass of the ink.

19. The ink jet recording method according to claim 1, wherein a content (% by mass) of a surfactant in the aqueous ink is 0.1% by mass or more to 5.0% by mass or less, relative to the total mass of the ink.

20. The ink jet recording method according to claim 1, wherein the coloring material comprises a pigment.

* * * * *